C. LOMAX.
COTTON CHOPPER.
APPLICATION FILED JAN. 7, 1914.
1,117,069.
Patented Nov. 10, 1914.
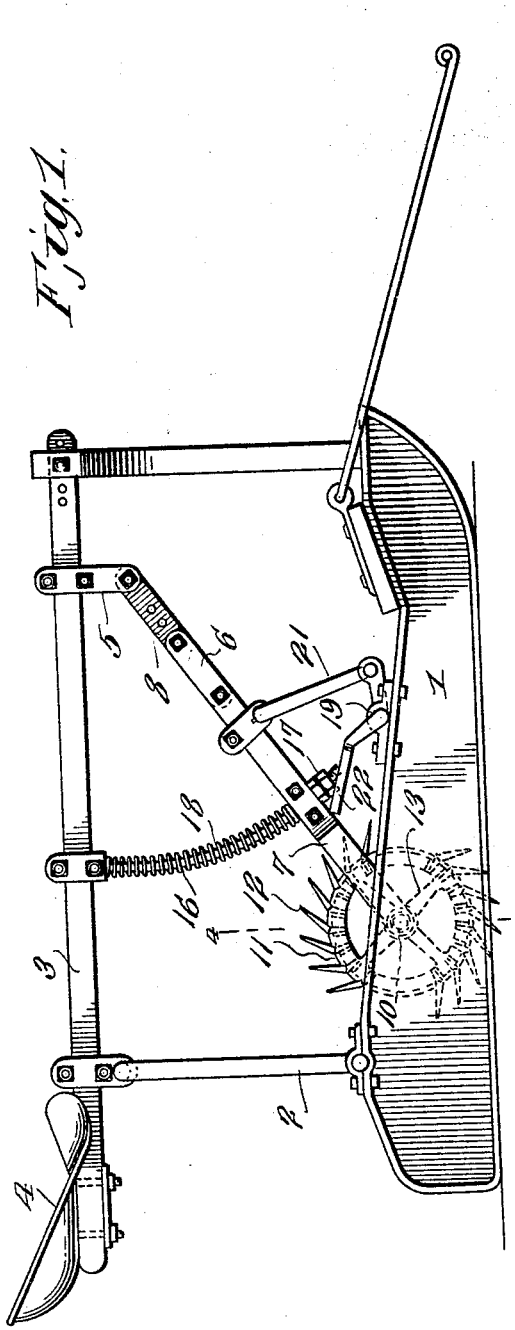
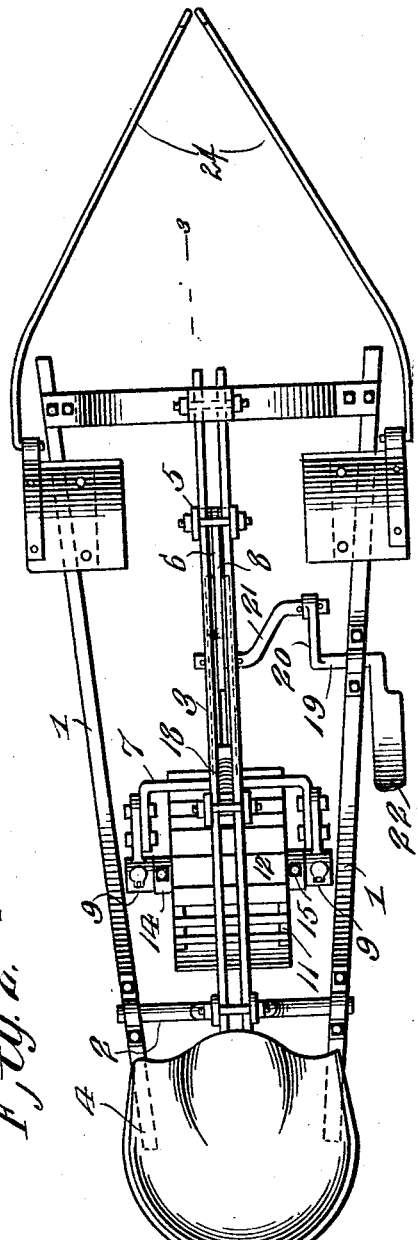
Witnesses
Frank Hough
K. Peacock.
Inventor
Charles Lomax,
By Victor J. Evans
Attorney

UNITED STATES PATENT OFFICE.

CHARLES LOMAX, OF RALLS, TEXAS.

COTTON-CHOPPER.

1,117,069.          Specification of Letters Patent.          Patented Nov. 10, 1914.

Application filed January 7, 1914. Serial No. 810,834.

*To all whom it may concern:*

Be it known that I, CHARLES LOMAX, a citizen of the United States, residing at Ralls, in the county of Crosby and State of Texas, have invented new and useful Improvements in Cotton-Choppers, of which the following is a specification.

This invention relates to cotton choppers and it consists in the novel features hereinafter described and claimed.

An object of the invention is to provide a chopper of simple structural arrangement which is adapted to be drawn along a row of standing plants and which is adapted to effectually chop or cut out the superfluous plants in the row.

With the above object in view the chopper comprises runners adapted to move along the soil at the opposite sides of the row. An arch member connects the runners together and a beam is mounted upon the arch member. An operator's seat is mounted upon the beam. A yoke is pivotally connected with the beam in advance of the seat. A revolving member is journaled between the ends of the yoke and is provided with knives or blades arranged in sets the members of which are in such close proximity as to chop out the superfluous plants. Spaces are provided between the sets of blades whereby certain plants may be left standing in the row. Means is provided for resiliently holding the said member in contact with the surface of the soil and a treadle operated means is provided for lifting the said member above the surface of the soil.

In the accompanying drawing: Figure 1 is a side elevation of the cotton chopper. Fig. 2 is a top plan view of the same.

The chopper comprises runners 1 upon which is mounted an arch member or bar 2. The rear portion of a beam 3 is mounted upon the intermediate portion of the said arch bar 2 and an operator's seat 4 is mounted upon the rear portion of the beam. The forward portion of the beam 3 is connected with a standard which is carried at the forward ends of the runners 1. A clip 5 is detachably and adjustably mounted upon the beam 3 in advance of the bar 2 and the stem 6 of a yoke 7 is pivotally connected with the lower portion of the clip 5. The stem 6 is composed of sections which are adjustably secured together whereby the said stem may be longitudinally extended or contracted the said adjustment being indicated at 8.

The yoke 7 carries at the ends of its branches bearings 9 in which a shaft 10 is journaled. Spaced wheels 11 are mounted upon the shaft 10 and blades 12 are carried at the peripheral portions of the said wheels 11. The end portions of the said blades are inserted in slots or recesses provided at the periphery of the wheel and the said blades are arranged in sets preferably two in number. The blades of each set are comparatively close together but are spaced approximately one half inch from each other. The sets of blades are spaced from each other for a distance of approximately three or four inches. The wheels 11 are provided with spokes 13 which are connected at their inner ends with hubs 14 and the said hubs in turn are provided with set screws 15 whereby they may be fixed with relation to the shaft 10.

A rod 16 is detachably and adjustably connected at its upper end with the beam 3 at a point between the clip 5 and the bar 2 and the lower portion of the said rod is slidably received in the stem 6 and passes transversely through the same. A nut 17 is screw threaded upon the lower end of the rod 16 below the stem 6 and the stem may have contact with the said nut whereby the downward swinging movement of the said stem is limited. A coiled spring 18 surrounds the intermediate portion of the rod 16 and bears at its upper end against the beam 3 or other relatively fixed supports and the lower end of the said spring bears against the upper side of the stem 6. The spring 18 is under tension with a tendency to hold the rear portion of the stem 6 away from the beam 3.

A shaft 19 is journaled upon one of the runners 1 and is provided at its inner end with a crank 20. A rod 21 is pivotally connected at its lower end with the crank 20 and at its upper end is pivotally connected with the intermediate portion of the stem 6. The shaft 19 is provided at its outer end with a foot rest or treadle 22. The operator who occupies the seat 4 may rest one foot upon the treadle 22. Foot rests 23 are mounted at the forward portions of the runners 1 and links 24 are pivotally connected with the said foot rests.

In operation draft animals are hitched to the links 24 in any suitable manner and the chopper is drawn along a row of plants with the runners 1 at the opposite side of the row. The wheels 11 travel between the runners 1 and normally move along the surface of the soil. Consequently as the chopper moves in a forward direction the said wheels are rotated and as the blades 12 are carried around by the wheels they chop out the superfluous plants in the row and when the spaces between the sets of blades receive between them plants in the row these plants are left standing in the row. By reason of the spaces provided between the blades and the sets of blades and the openings between the spokes of the wheels an excessive amount of trash or soil will not accumulate between the blades and the wheels during the chopping operation. The spring 18 bearing at its lower end against the stem 6 will have a tendency to resiliently hold the blades and wheels toward the surface of the soil, however the said blades and wheels may ride over obstructions in their path of movement as the chopper is drawn along the row of plants. When it is desired that the blades should be elevated above the surface of the soil the operator places his foot upon the treadle 22 and depresses the same whereby the shaft 19 is turned and the crank 20 moves the rod 21 longitudinally so that the rear portion of the stem 6 is elevated.

Therefore it will be seen that a cotton chopper having parts of simple and durable structural arrangement is provided and that the chopper may be quickly and easily operated or manipulated during the chopping operation.

Having described the invention what is claimed is:—

A cotton chopper comprising runners, an arch bar mounted thereon, a beam mounted upon the bar, a seat mounted upon the beam, a yoke having a stem pivotally connected with the beam, a chopper journaled in the yoke and located between the runners, spring means interposed between the yoke and the beam for holding the chopper toward the surface of the soil, a treadle mounted upon one of the runners and means operatively connecting the treadle with the stem of the yoke.

In testimony whereof I affix my signature in presence of two witnesses.

CHAS. LOMAX.

Witnesses:
HAROLD D. DURST,
T. S. CHANCE.

---

Copies of this patent may be obtained for five cents each, by addressing the "Commissioner of Patents, Washington, D. C."